United States Patent
Bosco

(10) Patent No.: US 10,059,180 B1
(45) Date of Patent: Aug. 28, 2018

(54) TONNEAU COVER ASSEMBLY WITH TONNEAU DIVIDER

(71) Applicant: GM GLOBAL TECHNOLOGY OPERATIONS LLC, Detroit, MI (US)

(72) Inventor: Anthony A. Bosco, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/700,651

(22) Filed: Sep. 11, 2017

(51) Int. Cl.
*B60J 7/16* (2006.01)
*B62D 33/04* (2006.01)

(52) U.S. Cl.
CPC .......... *B60J 7/1607* (2013.01); *B62D 33/042* (2013.01)

(58) Field of Classification Search
CPC .............................. B62D 33/042; B60J 7/1607
USPC ............ 296/100.01, 100.02, 100.03, 100.04, 296/100.05, 100.06, 100.07, 100.08, 296/100.09, 100.1; 410/129
See application file for complete search history.

(56) References Cited

U.S. PATENT DOCUMENTS

| | | | | |
|---|---|---|---|---|
| 5,201,561 A * | 4/1993 | Brown | ...................... | B60R 9/00 160/213 |
| 5,368,354 A * | 11/1994 | Martin | ...................... | B60N 2/24 296/100.07 |
| 6,135,527 A * | 10/2000 | Bily | .......................... | B60R 7/02 296/24.4 |
| 6,257,640 B1 * | 7/2001 | Leitner | ...................... | B60R 9/00 224/404 |
| 6,536,826 B1 * | 3/2003 | Reed | .......................... | B60P 3/42 224/404 |

* cited by examiner

*Primary Examiner* — Joseph D. Pape

(57) ABSTRACT

A tonneau cover system for a truck bed according to the present disclosure includes at least one tonneau panel configured to couple to a truck bed. The panel has a generally planar body with an exterior side and an interior side. The system additionally includes a generally planar movable flap coupled to the interior side. The movable flap is movable between a stowed position and a deployed position. In the stowed position the flap is disposed proximate and coplanar with the panel body, and in the deployed position the flap extends generally orthogonal from the body. The system additionally includes retention mechanism configured to selectively retain the flap in the deployed position or the stowed position.

9 Claims, 2 Drawing Sheets

US 10,059,180 B1

TONNEAU COVER ASSEMBLY WITH TONNEAU DIVIDER

TECHNICAL FIELD

The present disclosure relates to automotive vehicles, and more particularly to vehicles having bed or cargo areas and removable covers therefore.

INTRODUCTION

Many vehicles have a bed, cargo area, or other open compartment, usually disposed at a rear portion of the vehicle, to haul and/or store cargo. The vehicle may include a cover assembly, which may be referred to as a tonneau cover, to conceal and protect the interior of the bed or cargo area and any of the cargo therein. In addition, tonneau covers may improve aerodynamic performance of the vehicle by reducing drag. Tonneau covers are generally removably attached or secured to the vehicle, and may be made of rigid panels that are foldable and/or removable, or a flexible fabric material that may be rolled up and stored when not in use, often in the cargo area itself. Provisions for the tonneau cover, including, but not limited to, rails or a track built into the frame of the vehicle, may be provided by the vehicle manufacturer. Alternatively, after-market kits may be available, requiring vehicle operators to install the provisions themselves.

SUMMARY

A tonneau cover system for a truck bed according to the present disclosure includes at least one tonneau panel configured to couple to a truck bed. The panel has a generally planar body with an exterior side and an interior side. The system additionally includes a generally planar movable flap coupled to the interior side. The movable flap is movable between a stowed position and a deployed position. In the stowed position the flap is disposed proximate and coplanar with the panel body, and in the deployed position the flap extends generally orthogonal from the body. The system additionally includes retention mechanism configured to selectively retain the flap in the deployed position or the stowed position.

In an exemplary embodiment, the retention mechanism includes a strut having a first end and a second end. The first end is coupled to the panel and the second end being coupled to the movable flap.

In an exemplary embodiment, the at least one tonneau panel includes a hard shell panel. In such an embodiment, the hard shell panel may have a fore portion, an aft portion, and a central portion extending from the fore portion to the aft portion, with the movable flap being coupled to the central portion.

In an exemplary embodiment, the at least one tonneau panel includes a first panel coupled to a second panel with a foldable interface between the first panel and the second panel. The first panel is provided with a rigid beam member at the foldable interface, and the movable flap is coupled to the rigid beam member.

In an exemplary embodiment, the retention mechanism includes a first retention interface member couplable to a second retention interface member secured to the truck bed.

An automotive vehicle according to the present disclosure includes a cargo area defined by a bed and a plurality of sidewalls. The vehicle additionally includes at least one tonneau panel removably coupled to at least one of the plurality of sidewalls. The panel has an interior side oriented toward the bed. A movable flap is coupled to the interior side. The movable flap is movable between a stowed position and a deployed position. In the stowed position the flap abuts the panel body, and in the deployed position the flap extends from the interior side toward the bed. The vehicle further includes a retention mechanism configured to selectively retain the flap in the deployed position or the stowed position.

In an exemplary embodiment, the retention mechanism includes a strut having a first end and a second end. The first end is coupled to the panel and the second end being coupled to the movable flap.

In an exemplary embodiment, the at least one tonneau panel includes a hard shell panel. In such an embodiment, the hard shell panel may have a fore portion, an aft portion, and a central portion extending from the fore portion to the aft portion, with the movable flap being coupled to the central portion.

In an exemplary embodiment, the at least one tonneau panel includes a first panel coupled to a second panel with a foldable interface between the first panel and the second panel. The first panel is provided with a rigid beam member at the foldable interface, and the movable flap is coupled to the rigid beam member.

In an exemplary embodiment, the retention mechanism includes a first retention interface member and a second retention interface member, with the first retention interface member being associated with the flap and the second retention interface member being associated with the cargo area.

Embodiments according to the present disclosure provide a number of advantages. For example, the present disclosure provides a tonneau cover deployable to subdivide the cargo area into multiple compartments when desired, and moreover provides a convenient interface for moving between stowed and deployed positions.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
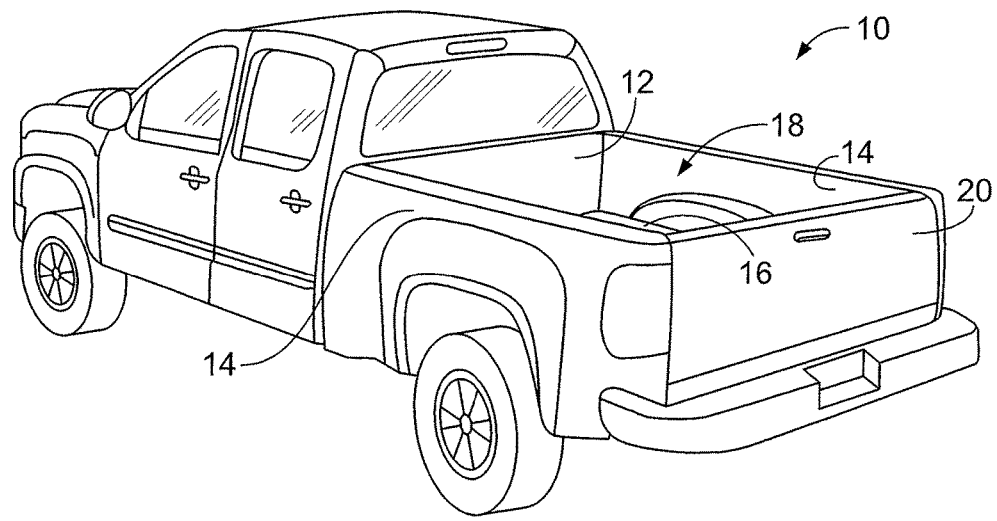
FIG. 1 is an illustrative view of an automotive vehicle according to an embodiment of the present disclosure.
Figure 2:
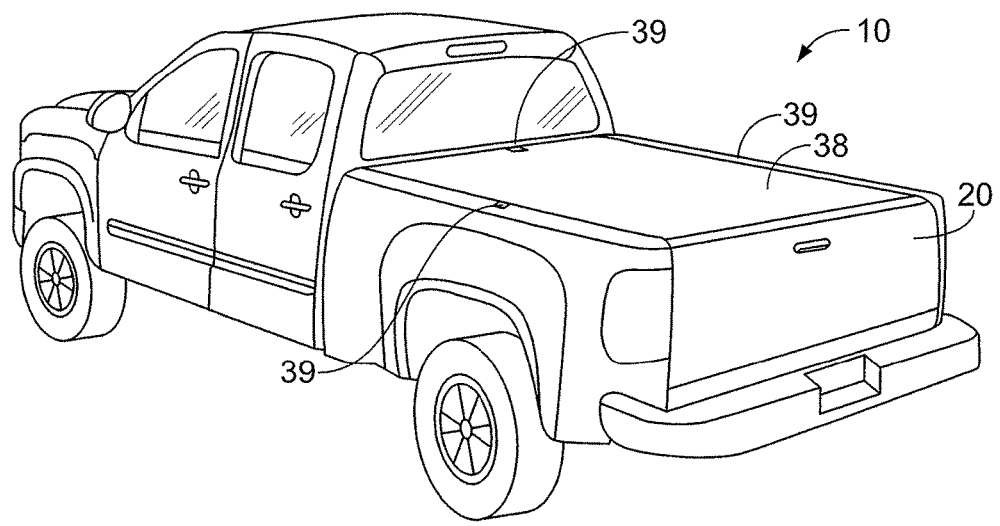
FIG. 2 is a second illustrative view of an automotive vehicle according an embodiment of the present disclosure.

Referring now to FIGS. 1 and 2, a vehicle 10 according to the present disclosure is illustrated. The vehicle 10 has a cargo area 18 defined by a front wall 12, two side walls 14, and a truck bed 16. While the vehicle 10 is shown as a pickup truck for illustrative purposes, it should be appreciated that other types of vehicles within the scope of the present disclosure may likewise have walls and a floor or a base defining a cargo area. The vehicle 10 also has a tailgate 20 that may be attached to the side walls 14 and/or the truck bed 16. The tailgate 20 may be in an open position, in which the cargo area 18 may be accessible, or in a closed position, in which the tailgate 20 further defines the cargo area 18.

The tailgate 20 also includes a tonneau cover 38 configured to cover the cargo area 18. The tonneau cover 38 may be selectively moved between a stowed position and a deployed position, illustrated in FIG. 2. The tonneau cover 38 may include at least one handle (not shown), strap, or the like to manually move the tonneau cover 38 between the stowed position and the deployed position. The tonneau cover 38 may be a so-called hard-shell made of a rigid material such as fiberglass, or a soft-shell made of a pliable material such as canvas, nylon, or vinyl.

In the deployed position, the tonneau cover 38 substantially covers the cargo area 18, and may be attached to the side walls 14 of the vehicle 10 such that the tonneau cover 38 is securely held in place. It may be attached via an attachment mechanism 39, which may be, but is not limited to, latches, straps, buckles, buttons, magnets, hooks, and the like. In the deployed position, the tonneau cover 38 may be further attachable to the front wall 12 of the vehicle 10 via another attachment mechanism 39. While FIG. 2 shows one attachment mechanism 39 on each side wall 14 and on the front wall 12, it should be appreciated that there may be any number of attachment mechanisms 39 on each wall 12 and 14. It should be further appreciated that the attachment mechanism(s) 39 may be on only one wall 12 and 14. The vehicle 10 may also include rails or tracks (not shown), in which the tonneau cover 38 may be slidable, in or on top of the side walls 14.

Figure 3:
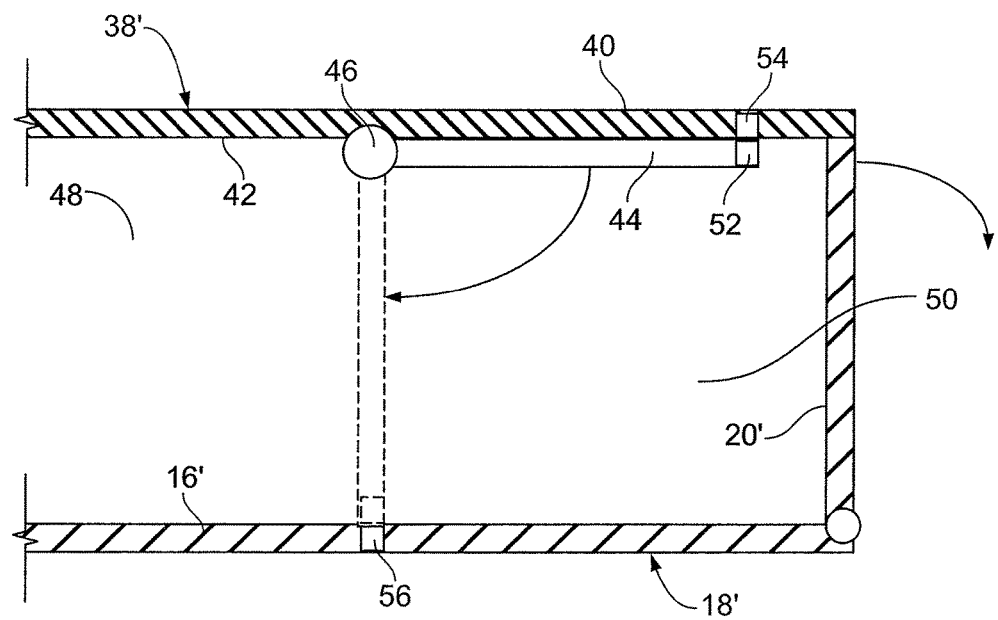
FIG. 3 is schematic representation of a tonneau cover assembly according to an embodiment of the present disclosure.

Referring now to FIG. 3, a tonneau cover 38' according to a first embodiment of the present disclosure is illustrated schematically. The tonneau cover 38' is secured to a cargo area 18' defined at least partially by a truck bed 16' and a movable tailgate 20'. The tonneau cover 38' has an exterior surface 40 and an interior surface 42. A movable panel 44 is provided on the interior surface 42. The movable panel 44 is coupled to the interior surface 42 via a hinge 46. The hinge 46 may include a conventional hinge mechanism such as a piano hinge, or may include other hinge arrangements such as a living hinge attachment between the interior surface 42 and the movable panel 44.

The movable panel 44 is movable between a stowed position and a deployed position, as illustrated in FIG. 3.

In the stowed position, the movable panel 44 is secured generally parallel with the plane of the tonneau cover 38'. In the embodiment depicted in FIG. 3 the movable panel 44 is disposed generally below the interior surface 42 when in the stowed position; however, in other embodiments the tonneau cover 38' may be provided with a recess such that when in the stowed position, the movable panel 44 is generally flush with the interior surface 42.

In the deployed position, the movable panel 44 projects generally orthogonal to the plane of the tonneau cover 38'. The movable panel 44 has a length dimension generally corresponding to the depth of the cargo area 18', such that when in the deployed position, the movable panel 44 extends from the interior surface 42 to the cargo area 18', thereby subdividing the cargo area 18' into a fore compartment 48 and an aft compartment 50.

The movable panel 44 is provided with a retention mechanism 52 configured to selectively maintain the movable panel 44 in the stowed or deployed positions, respectively. In this embodiment, the retention mechanism 52 includes a latch mechanism configured to selectively engage with a tonneau latch portion 54 to secure the movable panel 44 in the stowed position, or with a truck bed latch portion 56 to secure the movable panel 44 in the deployed position. The latch mechanism may include a mechanical latch, a magnetic latch, or any other appropriate latch mechanism.

As may be seen, an operator may selectively move the movable panel 44 between the stowed and deployed positions as desired, and secure it in the desired position. When the movable panel 44 is in the deployed position, an operator may open the tailgate 20' to access the aft compartment 50. Objects stored in the aft compartment 50 are thereby prevented from sliding into the fore compartment 48, while objects stored in the fore compartment 48 are thereby hidden from view. In some embodiments, the movable panel 44 may be provided with a lock mechanism to lock the movable panel in the deployed position and thereby prevent an unauthorized user from accessing the fore compartment 48.

Figure 4:
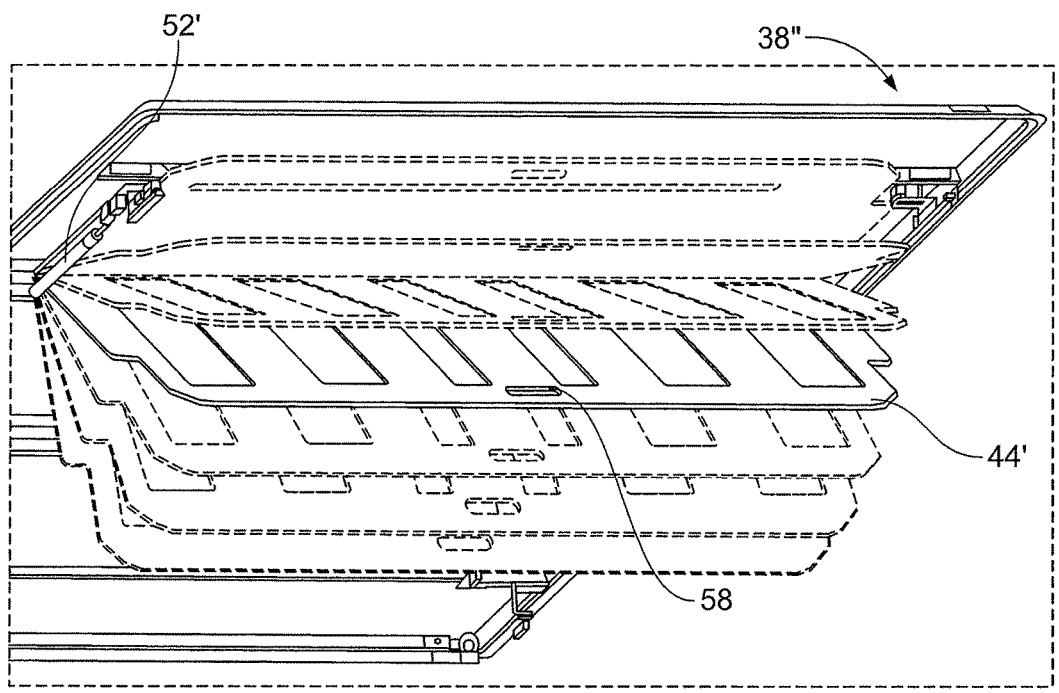
FIG. 4 is an isometric view of a tonneau cover assembly according to an embodiment of the present disclosure.

Referring now to FIG. 4, a tonneau cover 38" according to an alternative embodiment of the present disclosure is illustrated. The tonneau cover 38" is provided with a movable panel 44', movable between a stowed position and a deployed position, as illustrated. The movable panel 44' is provided with a retention mechanism 52' configured to selectively maintain the movable panel 44' in the stowed or deployed positions, respectively. In this embodiment, the retention mechanism 52' includes at least one strut, e.g. a gas strut, configured to maintain the movable panel in a given position. In addition, the movable panel 44' is provided with a handle 58 to facilitate movement between the stowed and deployed positions.

The present disclosure thereby provides a tonneau cover deployable to subdivide the cargo area into multiple compartments when desired, and moreover provides a convenient interface for moving between stowed and deployed positions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A tonneau cover system for a truck bed, the cover system comprising:
   at least one tonneau panel configured to couple to a truck bed, the tonneau panel having a generally planar body with an exterior side and an interior side, the tonneau panel including a hard shell panel having a fore portion, an aft portion, and a central portion extending from the fore portion to the aft portion;
   a generally planar movable flap having a first end and a second end, the first end being coupled to the interior side at the central portion, the movable flap being movable between a stowed position and a deployed position, wherein in the stowed position the flap is disposed proximate and coplanar with the body, and in the deployed position the flap extends generally orthogonal from the body; and
   a retention mechanism configured to selectively retain the flap in the deployed position or the stowed position.

2. The tonneau cover system of claim 1, wherein the retention mechanism includes a first retention interface member couplable to a second retention interface member secured to the truck bed.

3. An automotive vehicle comprising:
   a cargo area defined by a bed and a plurality of sidewalls;
   at least one tonneau panel removably coupled to at least one of the plurality of sidewalls, the tonneau panel having an interior side oriented toward the bed;
   a movable flap having a first end and a second end, the first end being coupled to the interior side, the movable flap being movable between a stowed position and a deployed position, wherein in the stowed position the flap abuts the body, and in the deployed position the flap extends from the interior side toward the bed; and
   a retention mechanism configured to selectively retain the flap in the deployed position or the stowed position, wherein the retention mechanism includes a strut having a first end and a second end, the first end being coupled to the tonneau panel and the second end being coupled to the movable flap.

4. The vehicle of claim 3, wherein the at least one tonneau panel includes a hard shell panel.

5. The vehicle of claim 4, wherein the hard shell panel has a fore portion, an aft portion, and a central portion extending from the fore portion to the aft portion, the movable flap being coupled to the central portion.

6. The vehicle of claim 3, wherein the retention mechanism includes a first retention interface member and a second retention interface member, the first retention interface member being associated with the flap and the second retention interface member being associated with the cargo area.

7. A tonneau cover system for a truck bed, the cover system comprising:
   at least one tonneau panel configured to couple to a truck bed, the tonneau panel having a generally planar body with an exterior side and an interior side;
   a generally planar movable flap coupled to the interior side, the movable flap being movable between a stowed position and a deployed position, wherein in the stowed position the flap is disposed proximate and coplanar with the body, and in the deployed position the flap extends generally orthogonal from the body; and
   a retention mechanism configured to selectively retain the flap in the deployed position or the stowed position, wherein the retention mechanism includes a strut having a first end and a second end, the first end being coupled to the tonneau panel and the second end being coupled to the movable flap.

8. The tonneau cover system of claim 7, wherein the at least one tonneau panel includes a hard shell panel.

9. The tonneau cover system of claim 8, wherein the hard shell panel has a fore portion, an aft portion, and a central portion extending from the fore portion to the aft portion, the movable flap being coupled to the central portion.

* * * * *